United States Patent
O'Hara

(10) Patent No.: US 9,047,629 B2
(45) Date of Patent: Jun. 2, 2015

(54) SYSTEM FOR HANDLING NETWORK TRANSACTIONS

(75) Inventor: John O'Hara, Lindfield (AU)

(73) Assignee: Safepay Australia PTY Limited, Sydney (AU)

( * ) Notice: Subject to any disclaimer, the term of this patent is extended or adjusted under 35 U.S.C. 154(b) by 623 days.

(21) Appl. No.: 12/506,429

(22) Filed: Jul. 21, 2009

(65) Prior Publication Data

US 2009/0313148 A1    Dec. 17, 2009

Related U.S. Application Data

(63) Continuation of application No. 09/979,767, filed as application No. PCT/AU00/00553 on May 25, 2000, now Pat. No. 7,581,257.

(51) Int. Cl.

| | |
|---|---|
| *G06Q 30/06* | (2012.01) |
| *G06Q 20/02* | (2012.01) |
| *G06Q 20/04* | (2012.01) |
| *G06Q 20/12* | (2012.01) |
| *G06Q 20/20* | (2012.01) |

(Continued)

(52) U.S. Cl.
CPC ............... *G06Q 30/06* (2013.01); *G06Q 20/02* (2013.01); *G06Q 20/04* (2013.01); *G06Q 20/12* (2013.01); *G06Q 20/206* (2013.01); *G06Q 20/385* (2013.01); *G06Q 20/40* (2013.01); *G06Q 20/401* (2013.01); *G06Q 40/12* (2013.01)

(58) Field of Classification Search
USPC ........... 705/26.1, 26.4, 50, 64, 75, 76, 78, 79, 705/342; 713/168, 170, 151; 235/376, 383, 235/472.03; 380/29, 30; 726/1–7, 26
See application file for complete search history.

(56) References Cited

U.S. PATENT DOCUMENTS

| 5,646,988 A | 7/1997 | Hikawa |
|---|---|---|
| 5,663,547 A | 9/1997 | Ziarno |

(Continued)

FOREIGN PATENT DOCUMENTS

| AU | 742367 B2 | 6/1999 |
|---|---|---|
| GB | 2 331 822 A | 6/1999 |

(Continued)

OTHER PUBLICATIONS

USPTO Office Action mailed Jun. 14, 2005 for parent U.S. Appl. No. 09/979,767.

(Continued)

*Primary Examiner* — Andrew Joseph Rudy
(74) *Attorney, Agent, or Firm* — DLA Piper LLP

(57) ABSTRACT

The present invention relates to a method of enabling a computer network transaction for a product being purchased by a buyer from a seller, comprising the steps of generating a once-only transaction identification means associated with the transaction, providing the transaction identification means to a transaction acquirer, together with a buyer identification means which identifies the buyer to the transaction acquirer, and providing the once-only identification means to the seller, whereby the seller may provide the transaction identification means to the transaction acquirer and the transaction acquirer can match the transaction identification means received from the seller with the transaction identification means they have been provided with and, if they match, can enable settlement of the transaction.

14 Claims, 3 Drawing Sheets

(51) Int. Cl.
 *G06Q 20/38* (2012.01)
 *G06Q 20/40* (2012.01)
 *G06Q 40/00* (2012.01)

(56) References Cited

U.S. PATENT DOCUMENTS

| | | | |
|---|---|---|---|
| 5,671,279 A | | 9/1997 | Elgamal |
| 5,715,314 A | * | 2/1998 | Payne et al. ............... 705/78 |
| 5,724,247 A | | 3/1998 | Dalstein |
| 5,740,361 A | | 4/1998 | Brown |
| 5,748,740 A | | 5/1998 | Curry et al. |
| 5,757,917 A | * | 5/1998 | Rose et al. ............... 705/79 |
| 5,815,665 A | | 9/1998 | Teper et al. |
| 5,826,241 A | * | 10/1998 | Stein et al. ............... 705/26.41 |
| 5,883,810 A | | 3/1999 | Franklin et al. |
| 5,899,980 A | | 5/1999 | Wilf et al. |
| 5,963,647 A | | 10/1999 | Downing et al. |
| 6,014,650 A | | 1/2000 | Zampese |
| 6,049,785 A | | 4/2000 | Gifford |
| 6,073,118 A | | 6/2000 | Gormish et al. |
| 6,188,994 B1 | | 2/2001 | Egendorf |
| 6,205,437 B1 | | 3/2001 | Gifford |
| 6,209,031 B1 | * | 3/2001 | Casey et al. ............... 709/222 |
| 6,213,391 B1 | | 4/2001 | Lewis |
| 6,226,412 B1 | | 5/2001 | Schwab |
| 6,247,047 B1 | | 6/2001 | Wolff |
| 6,253,189 B1 | * | 6/2001 | Feezell et al. ............... 705/14.61 |
| 6,311,896 B1 | * | 11/2001 | Mulla et al. ............... 235/472.03 |
| 6,324,526 B1 | | 11/2001 | D'Agostino |
| 6,327,578 B1 | | 12/2001 | Linehan |
| 6,456,984 B1 | | 9/2002 | Demoff et al. |
| 6,591,247 B2 | * | 7/2003 | Stern ............... 705/14.52 |
| 6,594,633 B1 | | 7/2003 | Broerman |
| 6,625,581 B1 | | 9/2003 | Perkowski |
| 6,636,833 B1 | | 10/2003 | Flitcroft et al. |
| 6,725,222 B1 | | 4/2004 | Musgrove et al. |
| 6,834,270 B1 | | 12/2004 | Pagani et al. |
| 6,847,953 B2 | | 1/2005 | Kuo |
| 7,107,227 B1 | * | 9/2006 | Bezos et al. ............... 705/14.71 |
| 7,155,409 B1 | * | 12/2006 | Stroh ............... 705/37 |
| 7,234,061 B1 | | 6/2007 | Diab et al. |
| 7,376,599 B1 | | 5/2008 | Gerhardt |
| 7,409,548 B1 | | 8/2008 | Brown et al. |
| 7,430,528 B2 | | 9/2008 | Perkowski |
| 7,437,310 B1 | | 10/2008 | Dutta |
| 7,581,257 B1 | * | 8/2009 | O'Hara ............... 705/75 |
| 7,689,468 B2 | * | 3/2010 | Walker et al. ............... 705/26.4 |

FOREIGN PATENT DOCUMENTS

WO 97/16897 A1 5/1997
WO 99/22291 A1 5/1999

OTHER PUBLICATIONS

USPTO Office Action mailed Mar. 9, 2006 for parent U.S. Appl. No. 09/979,767.
USPTO Office Action mailed Jul. 25, 2006 for parent U.S. Appl. No. 09/979,767.
USPTO Office Action mailed Dec. 13, 2007 for parent U.S. Appl. No. 09/979,767.

* cited by examiner

SYSTEM FOR HANDLING NETWORK TRANSACTIONS

FIELD OF INVENTION

The present invention relates to a system and method for enabling computer network transactions, and particularly, but not exclusively to a system and method for enabling transactions over wide area networks, such as, for example, the Internet.

BACKGROUND OF INVENTION

One of the major hurdles to the growth of commerce over computer networks such as the Internet is the difficulty in obtaining payment for a transaction occurring over the network. Users of the Internet are in the main reluctant to provide their credit card numbers over the Internet, generally because of a concern that the credit card number may be misappropriated and used by unauthorised persons, such as network "hackers". Even if the security risk is not as great as feared, the perception that the security risk exists is great and is effective in discouraging Internet commerce.

There is therefore a need for a secure system for enabling computer network transactions, particularly for wide area networks, such as the Internet, in order to facilitate network commerce. Attempts have been made to provide security for transactions over computer networks such as the Internet. These include complex encryption systems, aimed at blocking access by hackers to secure information. The problem with these systems is three-fold. Firstly, they are complex and can be difficult to implement. Secondly, no matter how good the encryption system, it is likely that at some time a hacker will find a way to break it. Thirdly, they give possession of credit card numbers to sellers, who may misuse them.

Another system involves a buyer entrusting their credit details to a "go-between" broker who acts for them in handling transactions without revealing to the sellers their credit card numbers. A problem with these systems is that brokers can only trade with a limited number of merchants they can trust and who are prepared to operate in a confined syndication with them. In effect, this sets up monopolistic enclaves with which buyers have to deal whether they like it or not.

SUMMARY OF INVENTION

The present invention provides a method of facilitating a computer network transaction for a product being purchased by a buyer from a seller, comprising the steps of generating a once-only transaction identification means associated with the transaction, providing the transaction identification means to a transaction acquirer, together with a buyer identification means which identifies the buyer to the transaction acquirer, and providing the once-only identification means to the seller, whereby the seller may provide the transaction identification means to the transaction acquirer and the transaction acquirer can match the transaction identification means received from the seller with the transaction identification means they have been provided with and, if they match, can enable settlement of the transaction.

Throughout this document, by "once-only" is meant that, preferably, for each transaction a unique transaction identification means for that transaction is generated. For another transaction, usually a different transaction identification means for that transaction will be generated.

Preferably, the method can be applied to a plurality of transactions and a plurality of users. Preferably, the transaction identification means is a different identification means for each transaction across all users and is preferably randomly generated for each transaction across all users.

Preferably, the method also includes the step of the transaction acquirer being provided with a date for the transaction, and also preferably a time of the transaction. Preferably, date and/or time of the transaction information is included with the transaction identification means provided to the transaction acquirer. Preferably, where the transaction identification means is a number, the date and time information is included as digits additional to the transaction identification number. This preferably guarantees unique identification of the transaction, across all users of the method of the present invention.

Preferably, the transaction identification means is generated at the time of the transaction. More preferably, it is generated in response to the buyer indicating an intention to purchase a product. Preferably, the indication that the buyer wishes to purchase a product is provided via a buyer computing system.

Preferably, the transaction identification means is a number which may be generated by a random number generator, such as a hit counter facility. It is possible that once the transaction has been settled, at some time the same number may be generated for another transaction (sometimes the same number can be generated randomly at different times). That same number will still uniquely identify the different transaction, however, because the different transaction will occur at a different point in time. It is very unlikely that two transactions will be associated with the same number over the same period of time. The term "once-only" should therefore be considered with this limitation in mind. As discussed above, to guarantee uniqueness, date and time information may be provided to the transaction acquirer in addition to the transaction identification means.

Throughout this document, by "product" is meant any goods or services, including software, which can be purchased by the buyer from the seller.

Throughout this document, by "computer network transaction" is meant any transaction which may occur across a computer network, such as the Internet, and includes all types of electronic commerce transactions.

Throughout this document the term "transaction acquirer" is to be given a broader meaning than its usual meaning of a third party which acquires a responsibility for a transaction (such as in a credit card transaction). The transaction acquirer may be a "trust-entity" who may be trusted to facilitate the transaction and may be separate from a transaction acquirer, funds provider such as a bank, whom the trust entity may liaise with in order to facilitate the transaction. The transaction acquirer may, however, be a funds provider, such as a bank.

Preferably, the buyer identification means is a PIN or password, but can be any number which identifies the buyer to the transaction acquirer. In some cases, the buyer identification means may be automatically provided by a computing system associated with the buyer, for example. A transaction acquirer may have a computing system which communicates with the buyer computing system and automatically identifies the buyer computing system from the communication. The buyer identification means is preferably an identification means which is personal to the buyer, however, such as a PIN or a password. This would enable the buyer to enter into transactions in accordance with the method of the present invention from any computing device. Further, this would prevent another person using the buyer computer to fraudulently enter into a transaction (if the method identified buyer via the buyer computer).

Preferably, the seller never receives the buyer identification means. The seller only receives the once-only transaction identification means. Because this once-only transaction identification means cannot be used again, a hacker who managed to obtain the once-only transaction identification means would find it useless.

The buyer identification means is secure because it is only provided to the transaction acquirer. It is therefore unlikely that the buyer identification means could be misappropriated.

In one embodiment, a transaction acquirer may be available on line to enable checking of the buyers credit before a transaction proceeds. This may only be necessary for transactions exceeding a certain value.

Alternatively, the seller may check with the transaction acquirer off-line before providing the goods/services.

A "scheme operator" may be involved in the transaction, and may be associated with the transaction acquirer in a similar way to credit card scheme operators presently involved in credit card transactions.

Preferably, the buyer, seller and transaction acquirer each has access to a buyer computing system, seller computing system and transaction acquirer computing system respectively, and communication is between the parties via these computing systems (which communicate over the computer network, preferably being the Internet).

The present invention further provides a system for facilitating a computer network transaction for a product being purchased by a buyer from a seller, comprising a generating means for generating a once-only transaction identification means and associating it with the transaction, providing means for providing the transaction identification means to a transaction acquirer computing system together with an associated buyer identification means which identifies the buyer, and for providing the transaction identification means to a seller computing system, whereby the seller may provide the transaction identification means to the transaction acquirer computing system and the transaction acquirer computing system can match the transaction identification means received from the seller computing system with the transaction identification means associated with the buyer, and if they match, the transaction acquirer will settle the transaction.

The transaction acquirer computing system preferably includes a database for maintaining payment details of the buyer, such as credit card details. Preferably, payment details for a plurality of buyers who use the system are maintained.

The generating means may be an application served by a server computer of the transaction acquirer computing system, or may be a program running on a buyer computing system for generating the transaction identification means. Preferably, the generating means is a random generator, arranged to randomly generate the transaction identification means. Preferably, the transaction identification means is a token, and may be a number or a token for identifying the transaction.

Where the generating means is an application served by a server computer, the generating means preferably automatically accesses the providing means and provides the transaction identification means to the transaction acquirer computing system. Where the generating means is an application running on an buyer computing system, the buyer computing system preferably accesses the providing means for providing the transaction identification means to the transaction acquirer computing system.

Preferably a date and preferably a time is also generated by the generating means and time and date information is provided by the providing means to the transaction acquirer computer along with the transaction identification means.

The present invention further provides a system for facilitating a computer network transaction for a product being purchased by a buyer from a seller, the system including a transaction acquirer computing system which includes storage means for storing a once-only transaction identification means generated in response to a buyer computing system, the once-only transaction identification means being associated with the transaction, the storage means also being arranged to store a buyer identification means which identifies the buyer associated with the transaction, receiving means for receiving from a seller a once-only transaction identification means, and comparison means for comparing the once-only transaction identification means received from the seller with the stored once-only transaction identification means, whereby if the comparison means determines a match between the transaction identification means, payment for the transaction may be facilitated.

Preferably, the transaction acquirer computing system also includes a payment enabling means for facilitating payment for the transaction if the once-only transaction identification means received from the seller and the stored once-only transaction identification means match.

The system preferably further includes a generating means for generating the once-only transaction identification means. The generating means may be an application served by a server computer of the transaction acquirer computing system, or may be a program running on a buyer computer system for generating the transaction identification means. The generating means is preferably a random generator, for randomly generating a transaction identification means. Preferably, the transaction identification means is a token, and may be a number or a token for identifying the transaction.

Preferably, the date and preferably the time of the transaction are also stored in the storage means, associated with the transaction identification means.

Preferably, the storage means is also arranged to store payment details of the buyer, eg, credit card details, to enable payment to be facilitated.

The present invention further provides a method of facilitating a computer network transaction for a product being purchased by a buyer from a seller, the method comprising the steps of a transaction acquirer receiving a once-only transaction identification means associated with the transaction, and associating the once-only transaction identification means with a buyer, identifier identifying the buyer receiving from a seller a once-only transaction identification means, comparing the once-only transaction identification means received from the seller with the once-only transaction identification means associated with the buyer identifier and, if they match, facilitating payment for the transaction.

Preferably, the once-only transaction identification means is generated in response to a buyer indicating they wish to purchase a product.

Preferably, the indication may be provided via buyer computing system.

Preferably, the once-only transaction identification means is randomly generated in response to the indication from the buyer. It is preferably a randomly generated token, such as a random number.

Preferably, the method also includes the step of associating the date and preferably the time of the transaction with the transaction.

Features and advantages of the present invention will become apparent from the following description of an embodiment thereof, with reference to the accompanying drawings, in which.

Figure 1:
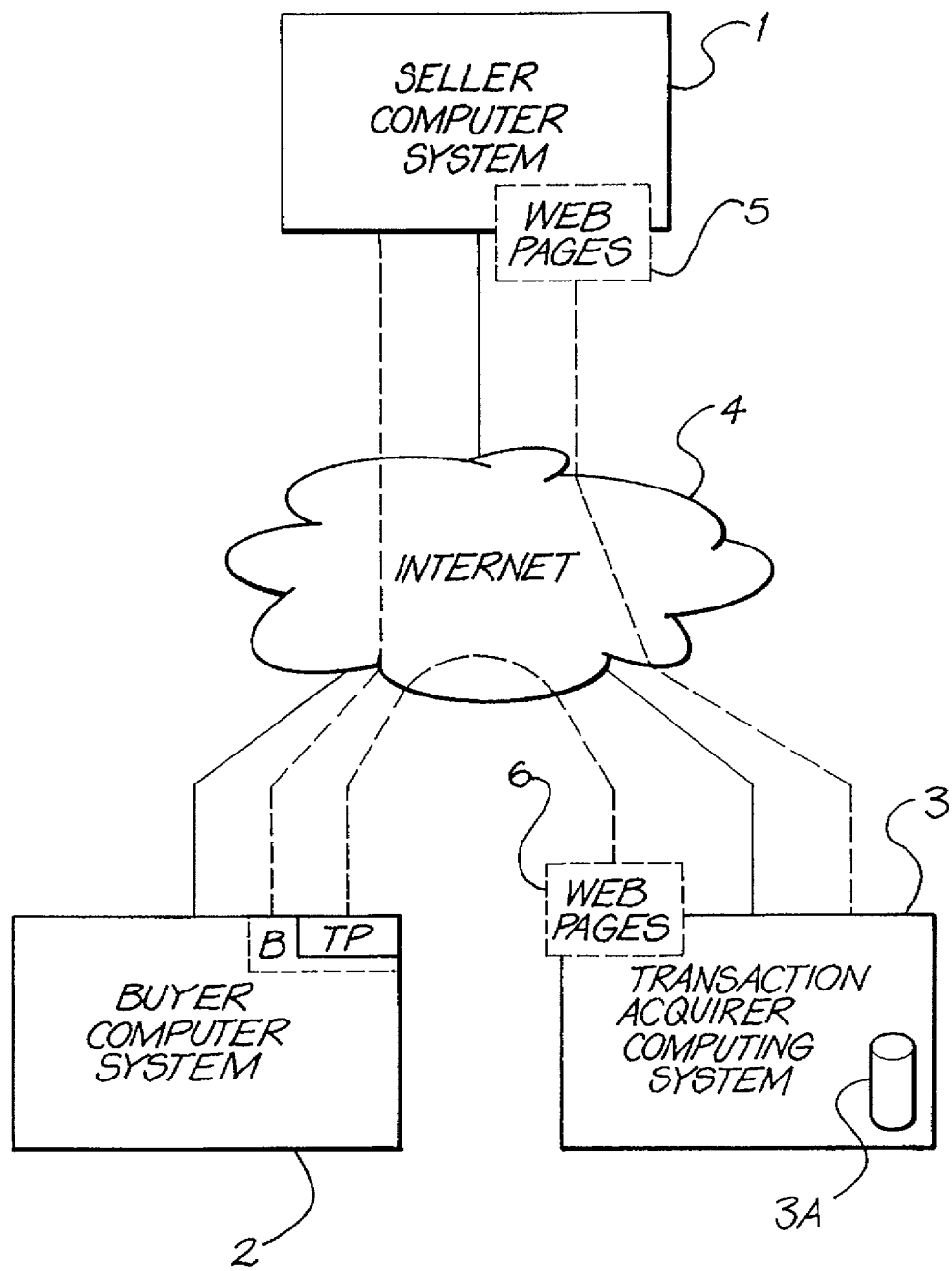
FIG. 1 is a schematic diagram for illustrating operation of a method and system in accordance with an embodiment of the present invention.

Referring to FIG. 1, a transaction acquirer computing system 3 is illustrated. In this embodiment the transaction acquirer computing system is a server computing system including means for serving web pages 6.

The transaction acquirer computing system 3 also includes a storage means, which in this embodiment comprises a database 3A. The storage means 3A is arranged to store a once-only transaction identification means (not shown) which has been generated in response to actuation of a buyer computing system 2. The buyer computing system may be any computing system, such as a PC, utilised by a buyer. The storage means 3A is also arranged to store a buyer identification means which identifies the buyer associated with the once-only transaction identification means. Receiving means in the form of web pages 6 in this embodiment are arranged to receive from a seller computing system 1 a once-only transaction identification means, a comparison means (not shown, but in this embodiment includes computer software running on the transaction acquirer computing system 3 is arranged to compare the once-only transaction identification means received from the seller with the stored once-only transaction identification means. If they match, the transaction acquirer computing system 3 is then arranged to enable payment for the transaction to the seller. In this embodiment, this can be by adjusting the credit card account of the buyer.

In more detail, the parties to the transaction, (being, seller computer system 1, buyer computer system 2, and transaction acquirer computer system 3) communicate with each other via the Internet 4. Each of the computer systems 1, 2, 3 may comprise a single PC or a network of PC's or other types of computers, as will be appreciated by a skilled person. In this embodiment, as discussed above, the transaction acquirer computing system includes a server computer for serving web pages 6.

The buyer computer system 2 includes a browser program B which enables a buyer to receive web pages. The seller computer system 1 is arranged to operate as a server, providing web pages 5 for browsing, in a known manner. The seller computer system web pages 5 may include information offering products and/or services for sale via the Internet 4.

In a conventional Internet commerce system, the buyer 2 would access the seller computer system 1 web pages 5 via the browser B, review the web pages and select goods/services for purchase. The web pages 5 will usually include an area for the buyer to enter details of an account via which the seller can receive payment for the goods/services. Most commonly, the buyer is requested to enter their credit card details, which are then provided to the seller computer system 1. Subsequently, the seller may provide the credit card details to a transaction acquirer (usually a bank or scheme operator that manages the buyers credit card account). The transaction acquirer will then settle the transaction by paying the seller and requesting payment from the buyer.

The main problem with this conventional approach is that it is necessary for the buyer to provide sensitive information (his or her credit card number) to a computer system (the seller computer system 1) which may not necessarily be secure. If the buyer regularly engages in electronic commerce he or she may be required to provide their credit card number to a plurality of seller computer systems. The more widely disseminated the buyer's credit card details become, the more likelihood that the details could be misappropriated by a hacker or unscrupulous seller and used to carry out unauthorised transactions.

The present invention provides an alternative to this inadequate and risky system.

The present invention relies on a buyer establishing a relationship with a transaction acquirer, in a similar way to the relationship which is established to manage a credit card. In the illustrated embodiment, the transaction acquirer provides the buyer with a unique buyer identification means, such as a password or ID number. Note that other identification means could be accepted by the transaction acquirer. Digital signatures or a unique identification of the buyer computer system 2 may be acceptable as well.

As well as the buyer identification means, a transaction program TP is provided. The transaction program TP may be provided by the transaction acquirer computer system and accessed via web pages 6 served by the transaction acquirer computer system. Alternatively, the transaction program TP may be resident on the buyer computer system 2 as illustrated in FIG. 1.

The transaction program, TP, is arranged to generate a once-only transaction identification means when a buyer is engaged in a transaction over the Internet 1. This transaction identification means is provided to the seller computer system 1. The transaction acquirer computer system 3 also receives the once-only transaction identification means, together with the buyer identification means associated with the once-only transaction identification means. The seller can subsequently present (on-line or off-line) the transaction identification means to the transaction acquirer, who can match this with the transaction identification means he has received from the buyer. If both transactions identification means match, the transaction acquirer may settle the transaction. At all times, all the seller receives is a once-only transaction identification means. This cannot be subsequently used by, for example, a hacker obtaining it, as it is only good for the one transaction. The buyer identification means is secure, as only the transaction acquirer and the buyer need to know it.

Once the transaction has been settled, the transaction acquirer disables the particular transaction identification means. In a preferred embodiment, if the same transaction identification means is received, the transaction acquirer will not settle a transaction. To facilitate the uniqueness of the transaction, information on time and date may also be provided to the transaction acquirer computing system, as discussed in the preamble of this document.

Figure 2:
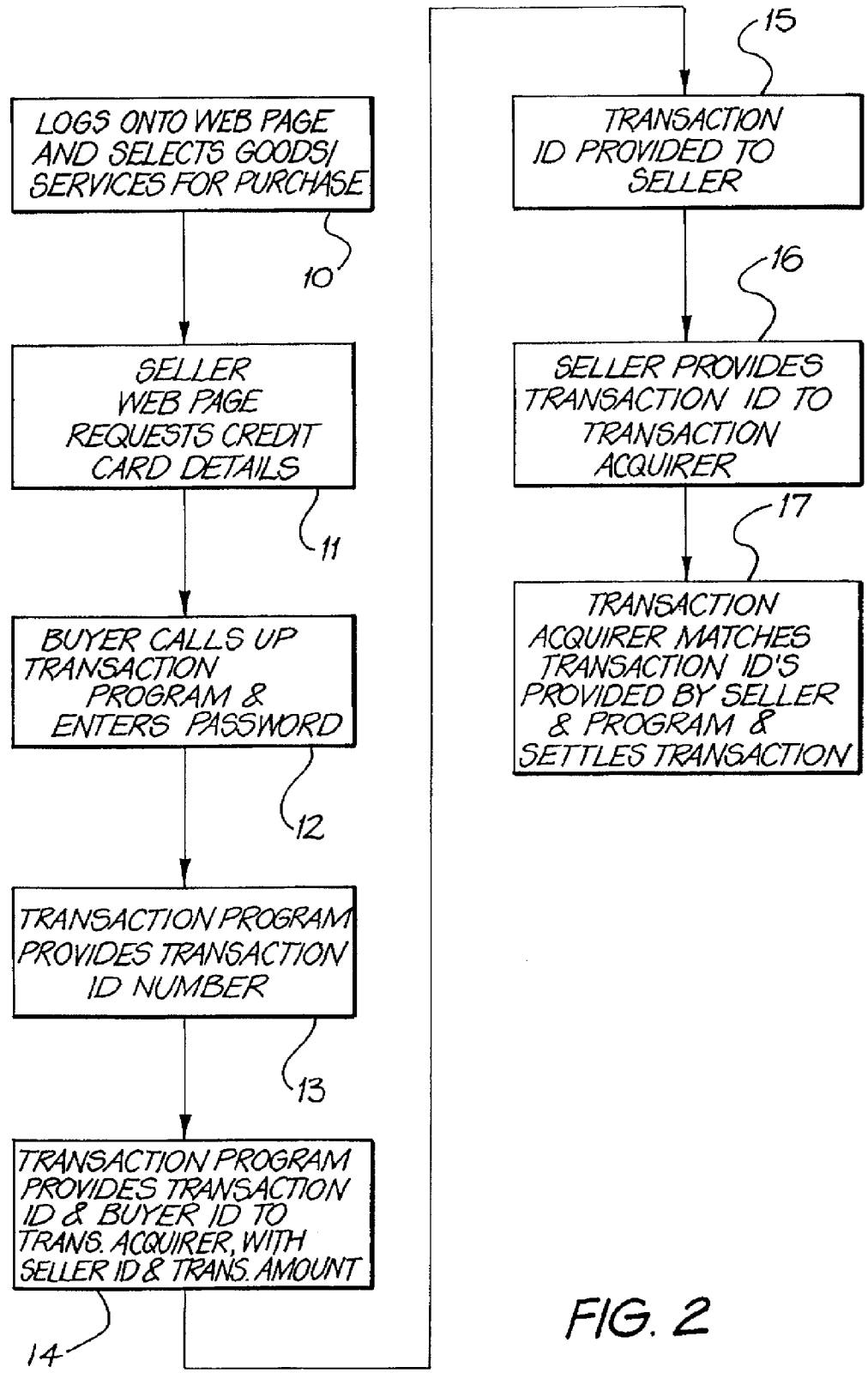
FIG. 2 is a flow diagram illustrating steps in a process in accordance with an embodiment of the present invention.

In more detail, referring to FIG. 2, in a transaction process in accordance with this embodiment of the invention, at 10, via the buyer computer system 2, the buyer logs onto the web pages 5 of the seller computer system 1 via browser B. The buyer selects goods/services for purchase and advises the seller computer system 1 via entry onto the web pages 5.

At 11 the seller web page requests credit card payment details, in the conventional manner. This is usually done by providing a space on web pages 5 for the buyer to enter the credit card details, plus personal details.

With the present invention, however, at 12 the buyer calls up the transaction program TP, either by "hyper linking" to web pages 6 on the transaction acquirer computer system 3, or calling up program TP from their own computer system 2. The buyer enters the buyer identification means, which in this case is a password which both the buyer and the transaction acquirer are aware of. The buyer may also enter the URL of the seller, the amount of money which is required to complete the transaction.

At 13, as the transaction program has been activated by the entering of the password, it provides a transaction ID number. In this embodiment, this is provided by a random number generator, such as a hit counter facility. This number is provided, together with the buyer identification password to the transaction acquirer computer system 3. Only the transaction ID number is provided via the web pages 5 to the seller computer system 1. This can either be done by manual entry of the transaction ID by the buyer into the appropriate space, or by the program automatically entering the transaction ID number into the web pages 5 and the seller computer system 1, steps 14 and 15.

The transaction program TP may also obtain other information relating to the transaction from the web pages 5. This could be done manually or done automatically. In this embodiment the extra information which is acquired is the identity of the seller (which may be provided by an identity number which is agreed between the transaction acquirer and the seller subscribing to the system or may be the seller systems URL) and the transaction amount. This information is provided to the transaction acquirer computer system. The transaction acquirer computing system 3 is also provided with the date and time of the transaction. This may automatically be generated by the system, or may be input by the buyer. Preferably, it is automatically generated by the system.

The transaction acquirer computer system 3 is therefore provided with all the information it needs to identify a buyer and a transaction and to settle the transaction with a seller. The only sensitive information used in the transaction (buyer ID) is known only by the buyer and the transaction acquirer. The transaction ID is not sensitive because it cannot be used again, and this is the only information which is provided to the seller computer system 1.

At 16, in order to settle the transaction the seller provides the transaction ID that they have been provided with to the transaction acquirer. This could be done via the Internet but could equally well be done another way, e.g., by telephone, in writing, etc. At 17 the transaction acquirer matches the transaction ID's provided by the seller and provided by the transaction program TP, and settles the transaction with the seller and the buyer.

The transaction acquirer may charge a commission to the subscribing seller, after the same fashion as now obtained with transactions using credit cards. The difference in the case of the present invention, however, is that once the transaction has been approved, the transaction ID for this particular transaction would be disabled. In an embodiment of the invention, it a transaction identification means is received which is the same as a disabled transaction identification means, the transaction will not proceed. In this case, the transaction acquirer system includes comparison means for comparing received transaction identification means with disabled transaction identification means. This is a further guarantee of the uniqueness of the once-only transaction identification means.

The transaction program may enable successive numbers to be generated for successive transactions while keeping open both the program and the seller web page.

An alternative embodiment of the present invention will now be described with reference to FIG. 3.

In the embodiment described in relation to FIGS. 1 and 2, the transaction acquirer is shown as a single entity. In this case the transaction acquirer may be a funds provider, such as a bank, so that the single entity can deal both with the security of the transaction and also payment for the transaction by debiting the buyers account and crediting the sellers account.

Figure 3:
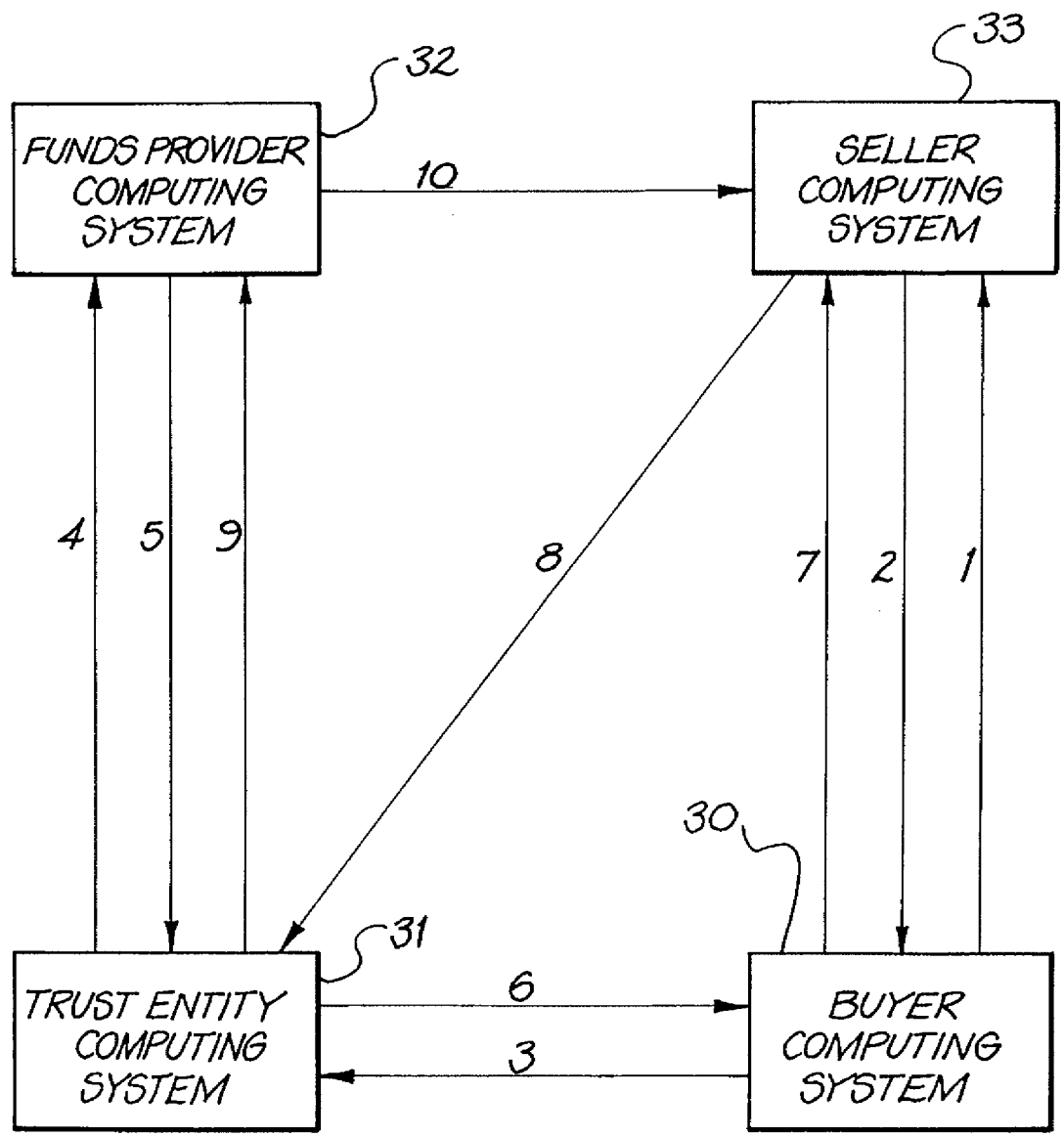
FIG. 3 is a schematic diagram for illustrating operation of a further embodiment of the present invention.

In the embodiment illustrated in FIG. 3, the transaction acquirer is a separate entity ("a trust entity") to the funds provider (which may be a bank), and further communications are required to enable payment for the transaction.

FIG. 3 schematically illustrates a buyer computing system 30, a trust entity computing system 31, a funds repository computing system 32 and a sellers computing system 33. These computing systems may communicate with each other via the Internet, using browsers and servers, in a known manner. The arrow headed lines connecting the blocks in the diagram indicate steps in the process of this embodiment of the invention as follows:

1. The buyer computing system 30 reviews web pages provided by the sellers computing system 33 (steps 1 and 2). The buyer decides that they wish to purchase a product provided by the seller and to do this they bring up the web page of the trust entity computing system 31 (step 3). The buyer computing system 30 requests a once-only transaction number from the trust entity computing system, in order to enable the transaction, and also provides the trust entity computing system 31 with further details of the transaction, such as seller identification (URL) the amount of payment required, date and time and any other information which may be required.

In step 4, the trust entity computing system 31 communicates with the funds repository computing system 32 to determine whether the buyer has sufficient credit to cover the transaction. The trust entity computing system 31 may also require the funds provider 32 to "quarantine" the payment amount for the transaction, so that it will not be used for anything else until the transaction is settled with the seller.

In step 5, the funds repository computing system 32 communicates with the trust entity computing system 31 confirming or denying the credit worthiness of the buyer.

If the buyer is credit worthy, in step 6, the trust entity computing system 31 causes a once-only transaction number to be generated. This is associated in the trust entity computing system 31 storage means (not shown) with a buyer identification of the buyer computing system 30. The buyer identification means may be a password entered by the buyer to the trust entity computing system 31, in step 3.

In step 7 the buyer computing system 30 transmits the once-only transaction number to the seller computing system 33. Following on, in step 8 the seller computing system 33 transmits the once-only transaction number to the trust entity computing system 31, which compares it with the stored once-only transaction number. If the comparison matches, the trust entity computing system 31 (step 9) instructs the funds repository 32 to pay the seller (step 10) and the transaction is completed. The seller now provides the product to the buyer.

In both above embodiments, the transaction identification means is a randomly generated number. In addition to the transaction identification means, date and time information of the transaction is provided, as well as a country abbreviation (so that the location of the transaction can be ascertained), and card type (is it a credit card, a debit card, what "brand of card" etc.) is also provided, in the following format:

DATE/COUNTRY ABBREVIATION/CARD TYPE/RANDOM NUMBER (TRANSACTION IDENTIFICATION MEANS).

Note that sellers may be kept in a sellers list by the transaction acquirer so that there is a list of sellers accessible to potential buyers using this invention. To participate as sellers, sellers merely need to ensure that their systems recognise and act on transaction identification means (as opposed to credit card numbers). An application program may be provided to run on a sellers computing system.

In the above embodiments, the user's payment information is credit card details. It may be any account information, including debit cards, bank account, and more.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The claims defining the invention are as follows:

1. A method of facilitating a computer network transaction between at least one buyer and at least one seller, comprising:
    at a transaction acquirer computer in communication with a network,
    receiving a transaction request generated at a buyer computer system via the network;
    generating, in response to the received transaction request, a once-only transaction identifier;
    storing the once-only transaction identifier in a database;
    relating the stored once-only transaction identifier in the database to the buyer;
    sending the once-only transaction identifier to the buyer computer system via the network,
    receiving a seller transaction identifier from a seller computer system via the network;
    comparing the stored once-only transaction identifier with the received seller transaction identifier; and
    facilitating settlement of the transaction if the comparison is a match.

2. The method of claim 1, further comprising, via the the transaction acquirer computer,
    assigning and storing a time and date for the once-only transaction identifier.

3. The method of claim 1, wherein the transaction acquirer computer stores payment details of the buyer.

4. The method of claim 1, wherein the generating the once-only transaction identifier includes randomly generating a number as the identifier.

5. The method of claim 4, wherein the once-only transaction identifier is a token.

6. A system for facilitating a computer network transaction, comprising:
    a transaction acquirer computer in communication with a network, configured to:
    receive a buyer identifier for a buyer via the network;
    receive a transaction request from the buyer computer system via the network, and in response, generate a once-only transaction identifier,
    associate the once-only transaction identifier with the buyer identifier;
    send the once-only transaction identifier to the buyer computer system via the network;
    receive a transaction identifier from a seller from a seller computer system and the network;
    compare the received transaction identifier from the seller to the stored once-only transaction identifier associated with the buyer; and
    facilitate settlement of the transaction if the comparison is a match.

7. The system of claim 6, wherein the transaction acquirer computer includes a database configured to maintain payment details of the buyer.

8. The system of claim 6, wherein the once-only transaction identifier is randomly generated.

9. The system of claim 8, wherein the transaction identifier is a token.

10. A method of facilitating a computer network transaction between at least a first party and a second party, the method comprising:
    at a transaction acquirer computer in communication with a network;
    receiving a first transaction identifier associated with a transaction, the first transaction identifier having been generated in response to a transaction request from the first party;
    associating the first transaction identifier with the first party in a database;
    receiving, via the network, from the second party a second transaction identifier;
    comparing the second transaction identifier received from the second party with the first transaction identifier associated with the first party; and,
    if first and second transaction identifiers match, facilitating settlement of the transaction.

11. The method of claim 10, further comprising randomly generating the first transaction identifier.

12. The method, of claim 10 wherein the first transaction identifier is a token.

13. The method of claim 10, further comprising disabling the first transaction identifier after settlement of the transaction.

14. The method of claim 10 wherein the transaction acquirer computer stores payment details of the buyer in the database.

* * * * *